United States Patent [19]

Tonita

[11] 4,160,151

[45] Jul. 3, 1979

[54] WELDING WIRE FEED SYSTEM

[75] Inventor: Peter Tonita, Windsor, Canada

[73] Assignee: C. H. Symington & Co., Inc., Royal Oak, Mich.

[21] Appl. No.: 811,649

[22] Filed: Jun. 30, 1977

[51] Int. Cl.² .............................................. B23K 9/12
[52] U.S. Cl. .............................. 219/137.8; 219/137.7; 219/137.9; 314/68
[58] Field of Search .............. 219/137.8, 137.7, 137.9, 219/130; 314/68; 226/189, 190; 242/128

[56] References Cited

U.S. PATENT DOCUMENTS

| 2,880,305 | 3/1959 | Baird | 219/137.9 X |
| 3,263,060 | 7/1966 | Bosteels | 219/137.7 |
| 3,293,477 | 12/1966 | Lobosco | 219/137.7 X |
| 3,501,613 | 3/1970 | Cornell | 219/137.9 |
| 3,553,423 | 1/1971 | Doxey | 219/137.7 |
| 3,582,599 | 6/1971 | Yohn | 219/137.8 X |
| 3,648,947 | 3/1972 | Shelton | 242/128 |

FOREIGN PATENT DOCUMENTS 218467 11/1958 Australia .................................. 219/130

Primary Examiner—Richard R. Kucia

[57] ABSTRACT

The invention relates to a welding wire feed system for feeding welding wire over a considerable distance from a remotely located wire storage spool to a welding gun through the use of straight lengths of angularly related conduit and intermediate low friction wire direction changing devices.

7 Claims, 3 Drawing Figures

WELDING WIRE FEED SYSTEM

The present invention relates to a welding wire feed system and specifically such a system wherein welding wire may be fed over a considerable distance from a remotely located wire storage spool to a welding gun.

It is becoming increasingly common in factory environments to store welding wire on large spools to eliminate the inconvenience and inefficiency occasioned by the frequent changing of heretofore used small capacity spools. For instance, in the past it has been common to provide a welding station with a relatively small size spool containing about 35 pounds of welding wire and locating such spool immediately above the welding gun operator. Such small spools have been used because they represent an acceptable size for lifting by an operator. The problem with such small spools is that they may have to be changed several times in the course of a normal eight-hour shift particularly when used in conjunction with an assembly line application. To avoid the necessity of frequent welding wire spool changes, it is now possible to use welding wire spools containing up to 500 pounds or more of wire which enables the welding gun to be used for many days, and sometimes for several weeks, before changing of the spool is necessary.

However, one of the difficulties in using such large spools is that congestion or limited space near the operator requires they be located remotely from the welding gun operator thereby requiring the welding wire to be fed over a considerable distance, for example, 50 or more feet. Inasmuch as such welding wire carries an electric charge when the operator is operating the welding gun and since such wire must also be protected from damage, the welding wire is normally contained in protective conduit means between the storage spool and the welding gun.

PRIOR SYSTEMS

With previous type systems wherein welding wire is fed over a considerable distance, it has been the practice to contain the welding wire either in a rigid or flexible conduit in order to protect both personnel and the wire. Since it is also common with such a system that the wire must pass through various turns or bends in progressing from the welding wire storage spool location to the welding gun, the frictional loads on such wire in rubbing against such conduits creates several problems. First, as a result of the friction created by the wire rubbing against a conduit, the load on the welding wire feed mechanism is of such magnitude as to cause slippage or erratic feeding of the welding wire thereby causing occasionally defective welding. Next, rubbing of the welding wire against the conduit, particularly where the wire changes direction, will erode and thus damage the conduit, eventually requiring its replacement.

PRESENT INVENTION

It is the purpose of the present invention to provide a welding wire feed system utilizing protective conduits wherein the frictional load on the welding wire is greatly reduced as it is fed from a remotely located wire storage spool to the welding gun. It is a particular purpose of the present invention to provide a unique mechanism for substantially eliminating friction at those points in the system where the wire has to change direction in order to progress from the storage spool to the welding gun and which wire direction changing condition is common in environments such as a highly congested assembly line. Not only is the subject system adapted to substantially eliminate friction loads on the wire as it changes direction, but also the system is so constructed and arranged that the wire is normally maintained out of contact with that portion of the protective conduit likely to impose the greatest frictional load on the welding wire.

As a consequence of the subject system, welding wire may be fed from substantially unlimited distances enabling the more convenient location of large capacity welding wire storage spools at a considerable distance from the welding gun operator.

The subject welding wire feed system includes a remotely located, large capacity welding wire spool having a wire pay-off or uncoiling device associated therewith which enables the welding wire to be fed in a generally upwardly or vertical direction off of the spool. A conventional welding wire feed device is mounted proximately overhead of the welding gun operator and may be mounted on a rail structure to permit the operator to move the feed mechanism for limited distances as the operator works on the part being welded. It is common to utilize short lengths of flexible welding wire conduit leading to and from the welding wire feed mechanism in order to facilitate movement by the welding gun operator. Normally, such short lengths of flexible welding wire conduit are each in the nature of six feet in length. The remainder of the conduited distance over which the welding wire must travel, which is frequently 50 or more feet, is the part of the system where heretofore significant frictional forces have been imposed on the welding wire.

In the subject invention applicant has developed a unique system of straight lengths of rigid conduit and one or more wire direction changing devices to greatly reduce the frictional load or drag on the welding wire. More specifically, it is common that the welding gun operator is located in a shielded booth or otherwise behind a walled structure while the large welding wire spool is located outside of such structure necessitating several changes in the direction through which the wire passes in being fed from the remotely located storage spool to the welding gun. Assuming the simple case of where the welding wire must be fed vertically upwardly from the welding wire storage spool then transversely to a position vertically above the welding gun operator and welding wire feed device, the subject system could include the following components. First, an initial length of rigid conduit would be coaxially aligned above the welding wire storage spool to receive the welding wire as it is paid off of the spool. At the first point where the welding wire must abruptly change direction, e.g. from vertical to horizontal feed, the first length of rigid conduit ends and a first wire direction changing device receives the welding wire and changes its direction from vertical to horizontal by passing the wire around a unique pulley-roller device. A second length of rigid conduit now receives the welding wire from the first wire direction changing device and guides such wire to a position above the welding wire feed device. Once again, as the welding wire feed now changes from a horizontal direction to a downwardly or vertical direction, a second wire changing device is employed. A third length of rigid conduit receives the welding wire from the second wire changing device and terminates at a sufficient distance from the welding wire feed system to permit the use of a short length of flexible conduit between the third rigid conduit and the welding wire feed system in those cases where the welding wire feed device is adapted to be moved by the operator to facilitate his movement around the work product being welded. An additional length of flexible conduit is connected from the output side of the welding wire feed device and connects at its other end to the welding gun.

Depending on the location of the welding wire storage spool and the barriers or obstructions to the feed of the welding wire to the welding gun, one or a plurality of such wire direction changing devices may be employed with the appropriate intermediate lengths of rigid conduit. The main purpose of the subject wire feed system is to insure that the welding wire over most of the length of its travel progresses in straight lines in a manner to substantially avoid contact with the rigid conduits as the wire is fed from the spool to the wire drive mechanism. Where the welding wire must change direction from one linear path to another, the welding wire leaves or passes from a rigid conduit and its direction is changed around a suitable wire direction changing device which imposes little or no frictional load on the welding wire.

Each welding wire direction changing device includes a grooved pulley rotatably mounted intermediate proximate ends of separate lengths of angularly related conduit. Each such device also includes a pair of circumferentially spaced guide rollers disposed intermediate the pulley and one end of a rigid conduit. Each guide roller is positioned to present a rotatable surface tangent to the longitudinal axis of an adjacent rigid conduit. The longitudinal axis of each rigid conduit, if extended, would pass slightly radially inwardly of the groove of the pulley. Thus, as the welding wire feeds from a length of conduit to engage the roller, it is maintained in contact with the pulley groove. At the same time, the relationship of the rigid conduit axis, roller surface, and pulley groove is such as to maintain the welding wire out of engagement with the rigid wire conduit when the welding wire is being fed through the system. In other words, as the welding wire feed device is energized by the welding gun operator to feed welding wire to the gun, the welding wire in the system is placed under a tension and in so doing is pulled out of any possible engagement with the rigid conduits as it feeds around the pulleys of the wire changing devices.

Thus, as welding wire feeds through the system it is out of engagement with the rigid guide conduits and rolls about the wire direction changing devices thereby creating little or no frictional drag as the wire is fed from the welding wire storage spool to the wire feed mechanism. The only meaningful frictional load imposed on the welding wire is through the short lengths of flexible conduit leading to and from the welding wire feed system. As a consequence of the subject system, welding wire may be fed over great distances with an effective frictional drag on the welding wire being limited to that generated by the passage of such wire through short lengths of flexible conduit.

The details of the subject invention will be hereinafter set forth in the description which follows and the associated drawings.

FIG. 1 discloses the subject invention in the environment of an automotive assembly line;

Figure 1:
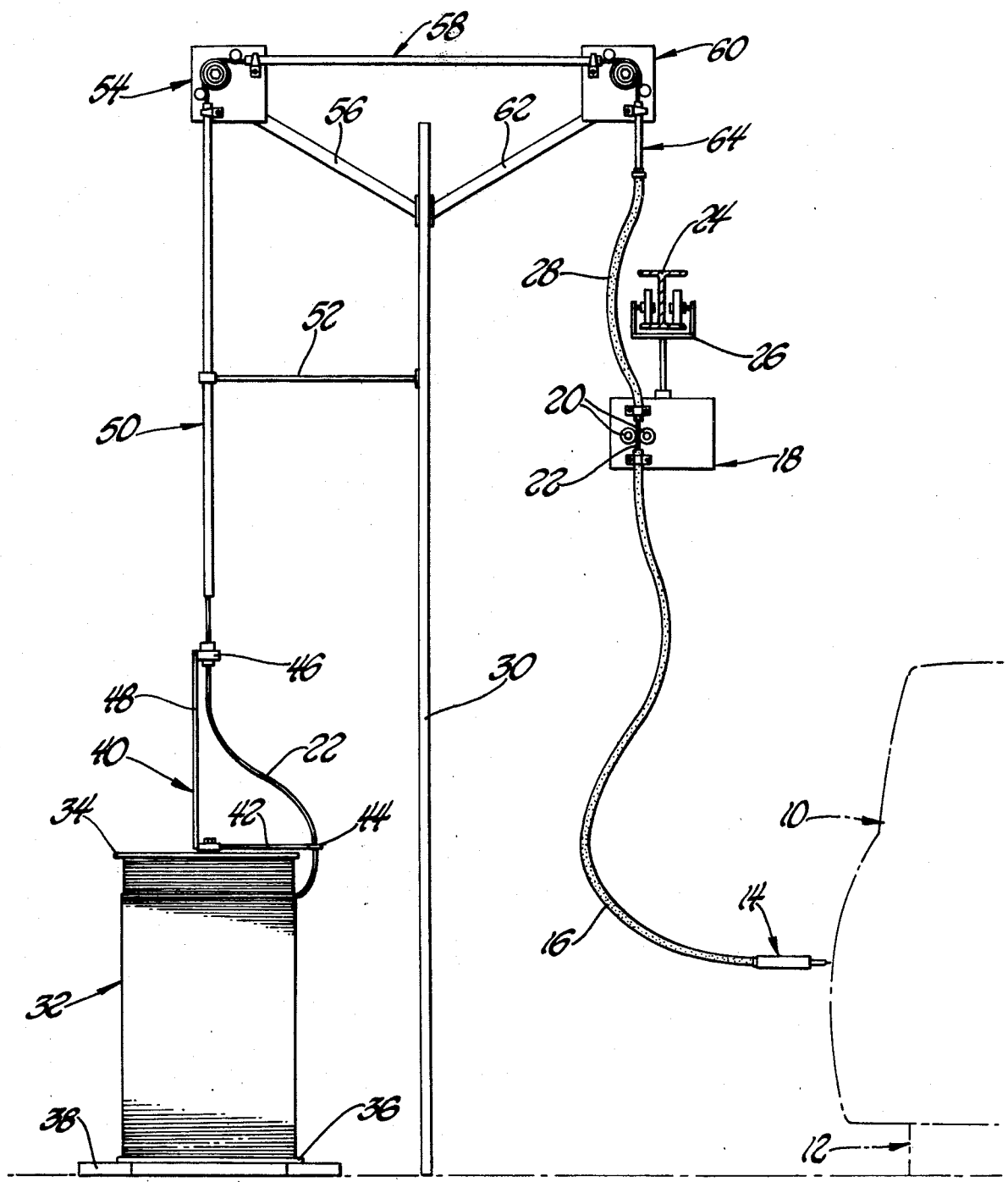

Since it represents an environment in which the invention is particularly useful, the subject system is illustrated as applied to an automotive assembly line. To this end, reference is made to FIG. 1 wherein a vehicle body is indicated at 10. Body 10 is movably mounted on an assembly or conveyor line indicated generally at 12. A welding gun is indicated at 14 and is connected through a length of flexible welding wire receiving conduit 16 to the output side of a welding wire feed device indicated generally at 18. Welding wire device 18 is of conventional design and includes a pair of power driven wheel members 20 which frictionally engage welding wire 22 to feed the same to the welding gun when the latter is energized by the welding gun operator. In an assembly line type of environment the welding gun operator frequently must walk along the length of the line for a short distance while he is welding a particular portion of the vehicle. Accordingly, it is common practice in such an application to mount the welding wire drive device 18 from an overhead I-beam 24 through a suitable roller supported bracket device 26 to permit the operator to pull the feed device with him as he changes position. To facilitate such movement of feed device 18, a second length of flexible conduit 28 is provided on the input side of feed mechanism 18. While they may change in particular installations, flexible conduits 16 and 28 are each likely to be about six feet in length.

It is to be understood that if the subject invention is used in an environment where the welding gun operator is not required to move significantly with the flow of an assembly line, then welding wire feed mechanism 18 need not be movably mounted upon I-beam structure 24 and can simply be suitably hung or supported from an overhead structure. In such case, and assuming feed mechanism 18 is rigidly supported, flexible conduit 28 could be eliminated in favor of a length of rigid conduit.

Continuing the description of the system as illustrated in FIG. 1, in order to shield personnel not involved in the welding operations, it is common that one or more welding gun stations be located in a booth or behind a protective wall indicated generally at 30. At the same time, and in view of the limited amount of space available between wall structure 30 and assembly line 12, it is now the preferred practice to provide a large capacity wire storage spool, indicated generally at 32, remote from the assembly line and outside of the protective wall structure 30. Welding wire spool 32 is preferably of the elongated type shown and described in copending application P-301 "Bulk Wire Storage and Transport System", Heuckroth now U.S. Pat. No. 4,114,771. As thus illustrated, spool 32 includes a pair of vertically spaced flanges 34 and 36 between which welding wire 22 is contained. Spool 32 rests upon flange 36 and the spool is, in turn, supported upon a pallet 38. Spool 32 is of the so-called dead-pay type wherein the spool remains stationary and supports a wire pay-off device 40 such as that shown in Shelton U.S. Pat. No. 3,648,947 which enables the wire to be uncoiled from the stationary spool. Payoff device 40 includes a rotatable, horizontally extending orbit arm 42 having a wire guide means 44 formed at the outer end thereof and which receives wire 22 therethrough. Wire 22 passes through wire guide means 44 to a second vertically spaced guide means 46 which is supported upon vertical arm 48 so as to be coaxially aligned with spool 32. Thus, as wire 22 is pulled by wire drive means 18, it is fed upwardly and coaxially from spool 32.

At this point it should be noted that, depending upon the location of wire storage spool 32 in relation to welding gun 14 and assembly line 12 and, further, depending on the number of factory structures around which the wire must be directed in feeding from the remotely located spool to the welding gun, numerous wire direction changes may be required. However, to simplify the disclosure of the invention, it has been depicted in the environment shown in FIG. 1 wherein the wire flows upwardly from spool 32, transversely across protecting structure 30, and downwardly to the feed mechanism 18 and welding gun 14.

As already noted, inasmuch as it is necessary to protect the welding wire from being damaged and to protect personnel from injury when the wire is "hot", the welding wire is normally encased in conduits as it flows from the wire pay-off device 40 to welding gun 14. Furthermore, and while not shown in the drawings, it is now common practice to protectively enclose the pay-off device 40, welding wire 22, and spool 32 by the use of a transparent shroud such as shown in copending application P-302 "Welding Wire Spool Shroud", Heuckroth, now U.S. Pat. No. 4,111,380.

The problem with previous type wire protecting conduit arrangements has been the frictional drag created on the welding wire, and thus wire feed device 18, as it passes through such conduit and also the erosion of such conduits as the welding wire rubs thereagainst particularly in the area where the conduit changes direction. The present invention avoids these difficulties by the means hereinafter described.

As will hereinafter be noted and with the exception of the short lengths of flexible conduits 16 and 28 leading to and from wire feed device 18, in the present invention only straight lengths of rigid conduit are utilized and where the direction of wire flow must be changed substantially frictionless wire direction changing devices are utilized. More specifically, a first length of rigid conduit 50 is coaxially aligned with wire spool 32 and vertically spaced above wire pay-off device 40. Conduit 50 is suitably supported through a bracket 52 to protective structure 30. It is also to be noted that conduit supporting bracket 52 is suitably insulated to prevent any electric current flowing to the protective structure when the welding gun 14 and wire drive mechanism 18 are energized.

At that point where it is necessary to change the direction of wire flow from vertical to horizontal in order to traverse the space above protective structure 30, a first wire direction changing device 54 is provided. Device 54 is supported upon protective structure 30 through a suitable bracket or arm 56.

A second straight length of rigid conduit 58 is secured to the first wire direction changing device 54 and extends horizontally above protective structure 30 and into the space generally vertically above wire feed device 18. In order to permit the wire to once again change direction from the horizontal to the vertical, a second wire direction changing device 60 is provided and again is suitably supported upon structure 30 through brackets or arm 62.

A third straight length of rigid conduit 64 is secured to the second wire direction changing device 60 and projects vertically downwardly toward welding wire feed device 18. Flexible conduit 28 is secured to the bottom end of rigid conduit 64 and is fixed at its other end to wire feed device 18 terminating proximate to wire drive wheels 20.

Figure 2:
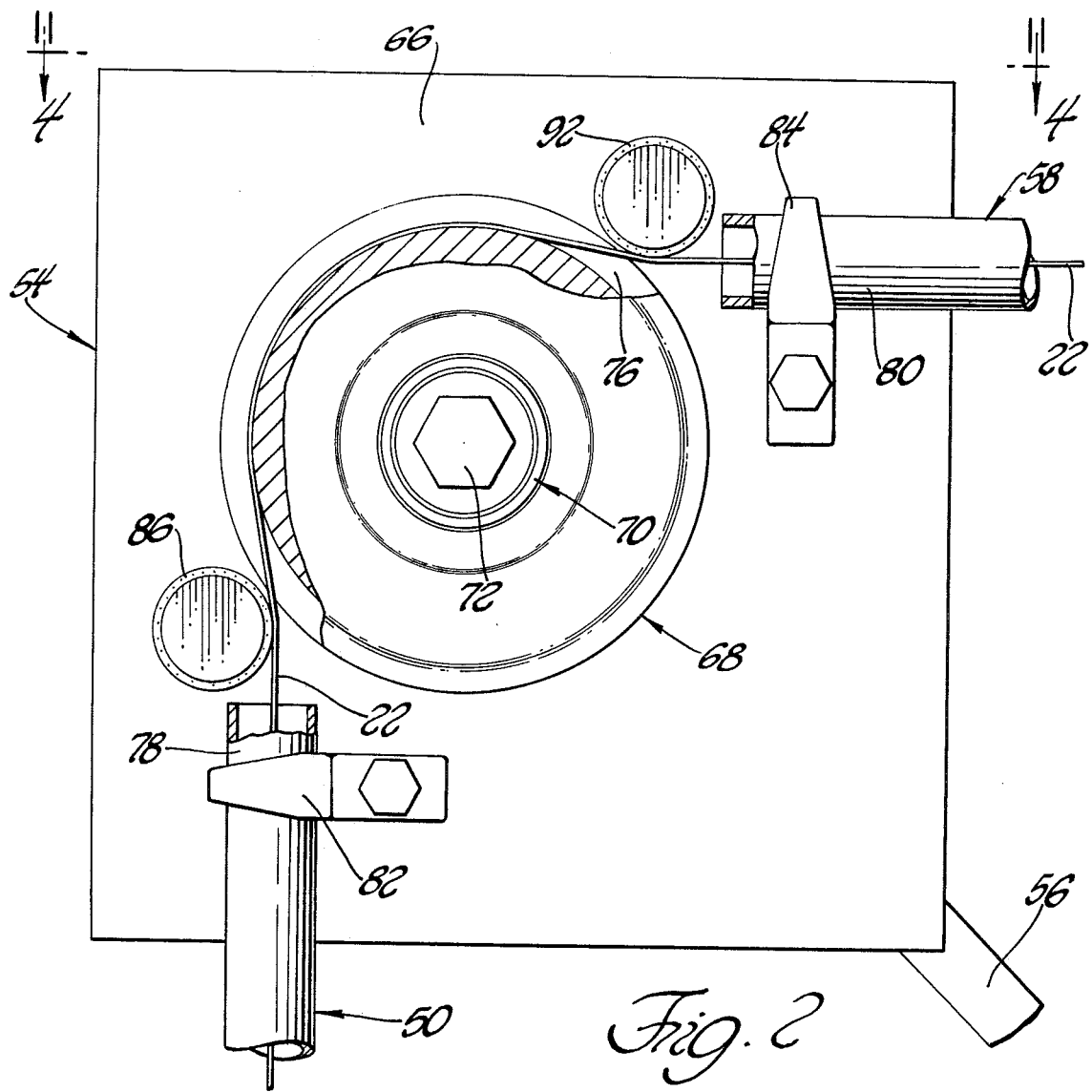
FIG. 2 is a partially sectioned view of a wire direction changing device.
Figure 3:
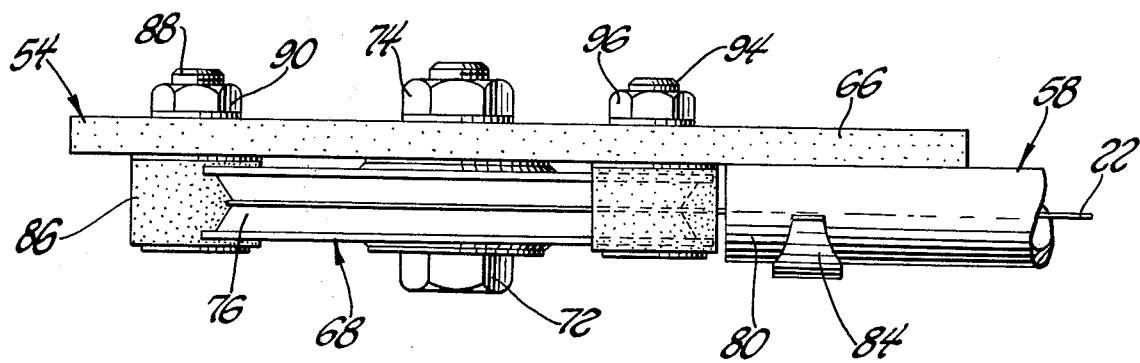
FIG. 3 is a view along line 4—4 of FIG. 3.

Wire direction changing devices 54 and 60 are of identical construction, therefore, the detailed description of one of such devices is all that is required. Referring now to FIGS. 2 and 3 of the drawings, wire direction changing device 54 will be described in detail. Device 54 includes a dielectric or insulative plate 66 suitably secured to supporting bracket 56. A pulley 68 is mounted through a suitable ball bearing arrangement, indicated generally at 70 and including bolt 72 and nut 74, to dielectric plate 66 so as to be freely rotatable relative thereto. Pulley 68 includes a circumferential groove 76 formed therein. It is to be noted that first and second lengths of rigid conduit 50 and 58 include ends 78 and 80 respectively secured to dielectric plate 66 through suitable C-shaped clamping members 82 and 84. The longitudinal axes of conduits 50 and 58 are coplanar and, if extended, would intersect with pulley 68 slightly radially inwardly of pulley groove 76.

A first roller member 86 is suitably mounted on dielectric plate 66 through a stud 88 and nut 90 and is disposed intermediate end 78 of conduit 50 and pulley 68. Roller 86 is so oriented as to present a rolling surface which is tangent to the longitudinal axis of conduit 50 and which surface, therefore, projects radially inwardly of pulley groove 76. A second roller member 92 is likewise mounted on dielectric plate 66 through stud 94 and nut 96 and is circumferentially spaced about the pulley so as to be substantially on the opposite side thereof from first roller member 86. Roller 92 is disposed between pulley 68 and end 80 of rigid conduit 58 and, likewise, includes an outer surface which projects radially inwardly of pulley groove 76.

As best seen in FIG. 2, roller 86 tangentially engages wire 22 as it emerges from conduit 50 so as to position the welding wire coaxially, or at least out of contact, with respect to the conduit. Similarly, roller 92 tangentially engages wire 22 as it emerges from pulley 68 and enters conduit 58 where the wire is also maintained in a generally coaxial relationship with the conduit. In addition to maintaining wire 22 in a coaxial relationship, or otherwise out of contact, with conduits 50 and 58, rollers 86 and 92 also maintain the wire in contact with pulley groove 76 for at least 90° of its circumferential extent. In so maintaining welding wire 22 in contact with the pulley groove, the wire is prevented from becoming disengaged from the pulley when the wire drive device 18 is inactive or not feeding wire 22 from spool 32 to welding gun 14.

It is thus apparent that the relationship of rollers 86 and 92 to pulley 68 is such that the welding wire is maintained out of contact with adjacent rigid conduits 50 and 58 when welding wire drive device 18 is energized to feed the wire to the welding gun. Further, inasmuch as rollers 86 and 92 and pulley 68 are rotatably mounted on dielectric plate 66, essentially no friction is generated by the wire as it passes through the rigid conduits and changes direction in passing from one angularly related conduit to the next. The effect of this arrangement is such that the only material frictional load or drag imposed on welding wire 22 is that experienced in passing through the short lengths of flexible conduit 16 and 28. On the other hand, the welding wire may pass through substantially unlimited lengths of rigid conduit combined with suitable wire direction changing devices without imposing any meaningful frictional drag on the wire. Accordingly, large capacity wire storage spools, such as 32, may be located in convenient positions or stations within the factory so as to enable the welding wire to be fed to the welding gun with a substantially equivalent frictional drag as would be experienced if the spool were located immediately proximate to the wire drive device 18 and welding gun 14.

It is apparent that other modifications of the invention may be made within the intended scope of the hereinafter appended claims.

What is claimed is:

1. A welding wire feed system of the type including a welding gun, a welding wire containing spool having axially spaced flanges, said spool being remotely located relative to said welding gun and supported upon one of said flanges, means associated with said spool for uncoiling the welding wire therefrom and paying out said wire in an upwardly direction coaxially of said spool, means proximate said welding gun for engaging and feeding the welding wire from said spool to the welding gun, and means for guiding said welding wire between said wire feeding means and said wire uncoiling means; the improvement comprising: welding wire guiding means which includes first and second wire direction changing means vertically spaced above both said spool and said wire feeding means; a first straight length of welding wire receiving conduit means aligned between said uncoiling means and said first wire direction changing means and being coaxial with said spool; a second straight length welding wire receiving conduit means disposed between one of said wire direction changing means and said wire feeding means, said wire direction changing means maintaining said welding wire substantially out of sliding engagement with said straight lengths of welding wire receiving conduit means when said feeding means is transmitting welding wire from said spool to said welding gun; each wire direction changing means including a pulley having a circumferential groove surface adapted to receive said welding wire, first and second rollers disposed about the periphery of each pulley for maintaining said welding wire in circumferential contact with each pulley groove surface and in coaxial alignment with said first and second conduit means.

2. A welding wire feed system as set forth in claim 1 wherein each wire direction changing means includes a dielectric plate upon which said pulley and said first and second rollers are rotatably mounted.

3. A welding wire feed system as set forth in claim 2 wherein one end of each said first and second wire receiving conduit means is secured to said dielectric plate.

4. A welding wire feed system of the type set forth in claim 1 wherein said first and second conduit means include coplanar axes which respectively intersect said pulley radially inside of its welding wire engaging groove surface.

5. A welding wire feed system of the type set forth in claim 1 wherein the first and second rollers of each direction changing means are circumferentially spaced about their respective pulleys so as to maintain said welding wire in contact throughout at least 90° of the pulley groove surface when said feeding means is moving said welding wire.

6. A welding wire feed system of the type set forth in claim 1 wherein said first and second conduit means include coplanar axes which respectively intersect the adjacent pulley radially inside of its welding wire engaging groove surface, said rollers including surfaces tangent to said wire as it enters and leaves the pulley of each direction changing means.

7. A welding wire feed system of the type including a welding gun, a welding wire containing spool having axially spaced flanges, said spool being remotely located relative to said welding gun and supported upon one of said flanges, means associated with said spool for uncoiling the welding wire therefrom and paying out said wire in an upwardly direction coaxially of said spool, means proximate said welding gun for engaging and feeding the welding wire from said spool to the welding gun, and means for guiding said welding wire between said wire feeding means and said wire uncoiling means; the improvement comprising wire guide means which includes a first wire direction changing device vertically spaced above said spool, a first length of welding wire receiving rigid conduit proximately aligned between said uncoiling means and said first device and being coaxial with said spool, a second wire direction changing device disposed above the wire feeding means and laterally spaced from said first device, a second length of welding wire receiving rigid conduit aligned between said first and second devices, a third length of welding wire receiving rigid conduit aligned between said second device and said wire feeding means, said rigid conduits and said devices being so related that the welding wire is substantially out of contact with said conduits as said wire is fed from said spool to the welding gun by the wire feeding means, each wire direction changing device including a dielectric plate, a grooved pulley wheel rotatably mounted upon said plate, a pair of rollers mounted on said plate proximate to and circumferentially spaced about said wheel, said rollers being disposed intermediate said wheel and adjacent ends of said rigid conduits so as to rollingly engage said wire and to maintain the same in circumferential engagement with the pulley groove.

* * * * *